US007325143B2

(12) United States Patent
Wettstein (10) Patent No.: US 7,325,143 B2
(45) Date of Patent: Jan. 29, 2008

(54) DIGITAL IDENTITY CREATION AND COALESCENCE FOR SERVICE AUTHORIZATION

(75) Inventor: Gregory H. Wettstein, Fargo, ND (US)

(73) Assignee: Linux Foundation, Boston, MA (US)

( * ) Notice: Subject to any disclaimer, the term of this patent is extended or adjusted under 35 U.S.C. 154(b) by 862 days.

(21) Appl. No.: 10/270,984

(22) Filed: Oct. 15, 2002

(65) Prior Publication Data

US 2003/0093681 A1 May 15, 2003

Related U.S. Application Data

(60) Provisional application No. 60/329,682, filed on Oct. 15, 2001.

(51) Int. Cl.
*H04L 9/32* (2006.01)
*G06F 7/04* (2006.01)
*H04K 1/00* (2006.01)

(52) U.S. Cl. .......................... 713/185; 713/155; 726/5

(58) Field of Classification Search ................ 713/155, 713/185; 726/5
See application file for complete search history.

(56) References Cited

U.S. PATENT DOCUMENTS

| | | | | |
|---|---|---|---|---|
| 5,343,527 A | * | 8/1994 | Moore ......................... | 713/179 |
| 5,754,659 A | * | 5/1998 | Sprunk et al. ................ | 380/30 |
| 5,825,884 A | * | 10/1998 | Zdepski et al. ............... | 705/78 |
| 6,012,090 A | * | 1/2000 | Chung et al. ................ | 709/219 |
| 6,032,260 A | * | 2/2000 | Sasmazel et al. ............. | 726/10 |
| 6,044,388 A | * | 3/2000 | DeBellis et al. ............. | 708/254 |
| 6,185,682 B1 | * | 2/2001 | Tang .......................... | 713/168 |
| 6,266,771 B1 | * | 7/2001 | Bellare et al. ............... | 713/176 |
| 6,505,244 B1 | * | 1/2003 | Natarajan et al. ........... | 709/223 |
| 6,516,412 B2 | * | 2/2003 | Wasilewski et al. ........ | 713/168 |
| 6,721,886 B1 | * | 4/2004 | Uskela ........................ | 713/168 |
| 7,080,077 B2 | * | 7/2006 | Ramamurthy et al. ......... | 707/9 |
| 2002/0126846 A1 | * | 9/2002 | Multerer et al. ............. | 380/251 |
| 2003/0061487 A1 | * | 3/2003 | Angelo et al. .............. | 713/176 |
| 2003/0065749 A1 | * | 4/2003 | Gailey et al. ................ | 709/219 |

OTHER PUBLICATIONS

Menezes et al, "Handbook of Applied Cryptography," 1997, p. 355.*
Brain, Marshall "How Web Servers and the Internet Work" Nov. 27, 1999, pp. 1-3. <http://web.archive.org/web/19991127121729/www.howstuffworks.com/web-server4.htm>.*

(Continued)

*Primary Examiner*—Emmanuel L. Moise
*Assistant Examiner*—Michael Pyzocha
(74) *Attorney, Agent, or Firm*—Fish & Richardson P.C.

(57) ABSTRACT

A system is disclosed to provide service authorization. The system provides authorized access to services using various identity tokens that represent authorized users, services, servers or other devices, as well as specific instances of users authorized for a service and specific instances of users authorized for a service on a particular server or other device.

55 Claims, 6 Drawing Sheets

OTHER PUBLICATIONS

G. W. Wettstein, Johannes Grosen, "Gaining the Middleground: A Linux-based Open Souce Middleware Initiative," Atlanta Linux Symposium; Oct. 2000, available at http://www.usenix.org/publications/library/proceedings/als2000/wettstein.html (13 pages).

R. Rivest, "the MD5 Message-Digest Algorithm," RFC1321, MIT Laboratory for Computer Science, Apr. 1992 (21 pages).

"Secure Hash Standard," FIPS PUB 180-1, May 11, 1993, (13 pages) available at http://www.itl.nist.gov/fipspubs/fip180-1.htm (13 pages).

H. Krawcyk, M. Bellare, R. Canetti, "HMAC: Keyed-Hashing for Message Authentication," RFC2104, Feb. 1997 (11 pages).

* cited by examiner

FIG. 1

FIG. 2
SERVICE AUTHORIZER

FUNDEMENTAL PERMUTATION PROCESS
FIG. 3

FIG. 4

STORAGE LOCATIONS FOR PERMUTED AND NON-PERMUTED IDENTITIES

DIGITAL IDENTITY CREATION AND COALESCENCE FOR SERVICE AUTHORIZATION

CROSS-REFERENCE TO RELATED APPLICATIONS

This application claims the benefit of U.S. Provisional Patent Application Ser. No. 60/329,682, filed on Oct. 15, 2001.

TECHNICAL FIELD

This disclosure relates to identity management, services management, and services authorization systems.

BACKGROUND

The data processing community has become increasingly dependent on secure and reliable access to services on the Internet and other distributed network environments. Meeting these challenges has required a technology architecture designed to provide a comprehensive framework for enterprise-based identification, authentication and authorization (IAA).

Identification refers to the ability to identify users reliably and consistently, preferably with a single identifier, globally throughout the enterprise. This functionality may be provided by a directory system that maps an external identifier, representing an entity name, to an internal invariant identifier known throughout the system.

The second component, authentication, typically uses cryptographic techniques to perform identity verification. The process of authentication guarantees that the user requesting a service or access to information is the person or system element that is actually the possessor of the identity. A number of techniques that rely on a shared secret known to both the user and requested service are available for carrying out such processes.

The third component, authorization, refers to what a properly authenticated identity is permitted to do with a networked object or information resource. A highly granular authorization technique provides a mechanism for customizing delivery of information to an identity.

SUMMARY

A system is disclosed to provide service authorization. The system provides authorized access to services using various identity tokens that represent authorized users, services, servers or other devices, as well as specific instances of users authorized for a service and specific instances of users authorized for a service on a particular server or other device.

Various aspects of the system relate to generating the identity tokens as well as using them to provide authorized access to a requested service.

For example, according to one aspect, a method includes generating a service authorization identity from a hashed message authentication coding algorithm that uses as input a service authentication key, a user identity and a service identity. The service authorization identity, the user identity and the service identity are permuted, and the permuted user identity, the permuted service identity and the permuted service authorization identity are stored in a directory.

In some implementations, the method also may include generating a server authorization identity from a hashed message authentication coding algorithm that uses as input the service authentication key, the user identity, the service identity and a server identity. The server identity and the server authorization identity may be permuted, and the permuted server identity and the permuted server authorization identity may be stored in the directory.

In another aspect, a method includes receiving a request for a service. A user identity and a service identity are obtained from a directory, and a service authorization identity is computed from a hashed message authentication coding algorithm using as input a service authentication key, the user identity and the service identity. The method includes comparing the computed service authorization identity to a service authorization identity stored in the directory, and determining whether to grant the request for service based on the comparison.

According to another aspect, a method includes receiving a request for a service. A user identity, a service identity and a server identity are obtained from a directory, and a server authorization identity is computed from a hashed message authentication coding algorithm using as input a service authentication key, the user identity, the service identity and the server identity. The method includes comparing the computed server authorization identity to a server authorization identity stored in the directory, and determining whether to grant the request for service based on the comparison.

A system, as well as articles that include a machine-readable medium storing machine-readable instructions for implementing the various techniques, are disclosed. Details of various implementations are discussed in greater detail below.

In some implementations, one or more of the following advantages may be present. For example, the authorization component of the system may leverage the identification and authentication components by integrating the identification and authentication processes into a highly granular service delivery process. Furthermore, in authentication systems where the shared secret may be time-based, an additional time-based secure authorization process can result. This may be particularly advantageous because it limits the extent to which a service can be used without a need to disturb the user identity or authentication.

A further benefit of an integrated authorization technique may be in the realm of service policy management. In addition to providing access to a service, the system may provide attributes for the quality of service (QOS) that an identity is allowed to obtain. For example, within a computing environment there is an increasing need to allocate bandwidth based on a number of factors including user identity, time of day, and application requirements. The allocation of disk resources for e-mail storage can be considered a QOS attribute. The authorization component of the system can provide a process for attributing services differently for each identity recognized in the system.

The system also may differentiate between service authorization and server authorization. Typically, service authorization implies that an entity is granted access to a particular service on a generic basis. By providing server authorization, the system provides the ability to control and define access to information based on the identity requesting the service and the server providing the service.

An additional benefit of the system relates to multi-phase authorization. A single-phase authorization is an authorization process that is completed by referencing information obtained from a single source such as a directory. The system may provide for multi-phase authorization that further enhances authorization security by performing a single-phase authorization to yield an intermediate set of authorization credentials which are then passed to an authorization server for additional verification and service approval. Such a system also may provide an advantage of maintaining state information describing the status of how a service is being used.

An additional benefit of the system relates to information disclosure. From both a privacy and security design perspective, the system may limit the amount of information that can be gained from access to directory servers by shrouding system identity information made available by network directory servers. As access to more sensitive services are contemplated by identities, it may become more important to restrict disclosure of information about the services available to the identity. In addition, by limiting the amount of or shrouding the information that can be gained from directory servers, the system may impede attempts to modify directory identity objects to enable services that have not been administratively authorized.

Additional features and advantages will be readily apparent from the following detailed description, the accompanying drawings and the claims.

DETAILED DESCRIPTION

Figure 1:
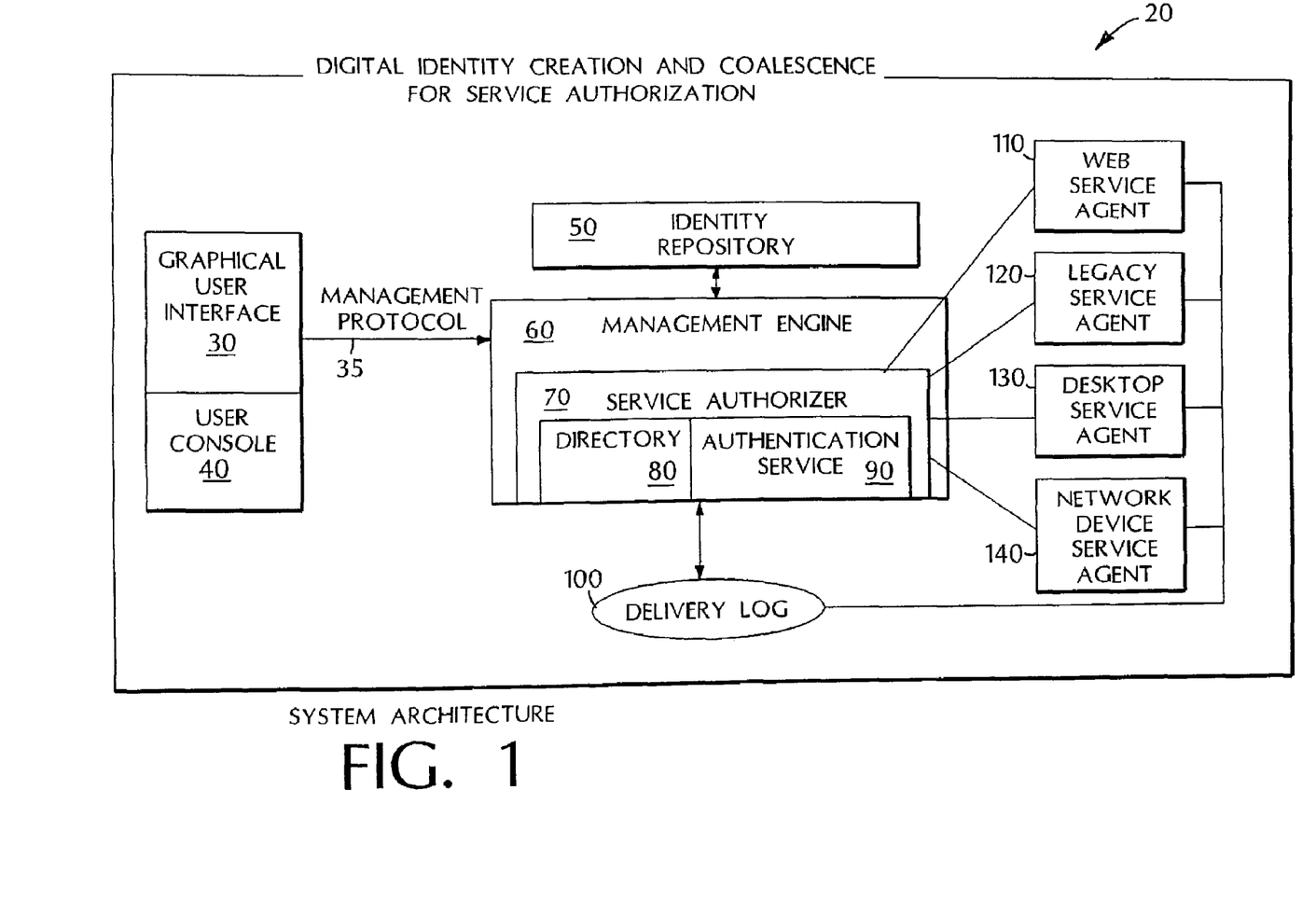
FIG. 1 illustrates an example of a computer-based service authorization system.

As shown in FIG. 1, a computer-based system 20 provides for the generation of identities as well as identification and authentication of those identities. A process for authorizing services specific to those generated identities is provided as a result of the identification and authentication processes. The system is designed to provide secured services to multiple users of the system simultaneously and independently.

As shown in FIG. 1, the system 20 includes an identity repository [i.e., directory] 50 that serves as the authoritative source for all information about identities, devices, services and instances of services. Although only a single identity repository 50 is illustrated in FIG. 1, the system may be configured to support multiple repositories.

A management engine 60 manages identities within the system. Management functions may be, but are not limited to, adding and managing identities, creating and modifying services, and allocating services to identities. Accessing and manipulating the functions of the management engine itself may be treated as a service, and subsets of that service may be allocated to users throughout the organization to provide secure delegated management capabilities.

A management protocol 35 provides access to the management engine 60 for facilities such as a graphical user interface 30. The graphical interface 30 provides functionality to create identities and attach services to identities and devices. Reports also may be generated about these activities. A user console 40 is available for performing user-allowed administrative activities such as password changes and for requesting service allocations for an identity.

A delivery log 100 provides an audit or accounting trail for tracking the access of services by identities. Functionally the log tracks service requests and deliveries as well as the success or failure of the request. The delivery log 100 may provide reports that can be requested through the management protocol 35.

As shown in FIG. 1, the system may include one or more service delivery agents 110, 120, 130, 140, which interact with other components of the system and play a role in the real-time computationally and cryptographically-based authorization process described in greater detail below. Although FIG. 1 depicts only four service agents 110, 120, 130, 140, the system is designed to allow for fewer or more. Service agents may be utilized by any Internet or intranet-based application, legacy system, or any internally or externally hosted system to provide secure and authenticated authorization services.

The management engine 60 includes a service authorizer 70 to provide secure, granular service authorizations. The service authorizer 70 creates identity tokens that represent service authorizations. The identity tokens may be generated by cryptographically combining the identity tokens of the user, service and optionally the device involved in the service delivery pathway. The service authorizer 70 cooperates with a directory server 80, such as a Lightweight Directory Access Protocol (LDAP) server, to store identity information. Other directory servers capable of storing cryptographic identifiers may be used in other implementations. The service authorizer also cooperates with an authentication service 90, such as Kerberos, to secure authorized services cryptographically. Other authentication systems capable of producing a secure authentication key may be used in other implementations.

Information stored in the directory 80 includes two types of objects: fundamental identities and derived identities. Fundamental identities may be generated, for example, for 15 organizations, users, services and servers or information delivery devices. A user may be any type of requesting entity known to the computer-based system 20. In one particular scenario, electronic mail may be considered the service, the server may be a host platform executing mail server software, the user may be an entity receiving electronic mail, and access to that entity's mail account may be the service. In one implementation, each fundamental identity may be assigned an opaque numerical token that conveys no information about the identity other than its existence. In general, however, 25 any unique sequence of identifiers may serve as the fundamental identity token. The generation of fundamental identity tokens is discussed in greater detail below.

Derived identities may be generated to represent instances of service-based or server-based authorizations for access to services by a fundamental user identity. Opaque numerical tokens may be used to represent these identities, although other unique sequences of identifiers also may serve as the derived identity tokens. Derived identities are formed from fundamental identities. The generation of derived identities is described in greater detail below.

In some implementations, there are two types of derived identities. One type of derived identity, a service authorization identity, conveys an identity which represents access to an information service by a user identity where delivery of the service is not limited to a particular server or other device. A second type of derived identity, a server authorization identity, conveys an identity which represents access to an information service delivered to a user identity by a particular server or device. The system may support additional types of derived identities.

The fundamental and derived identities are stored in the identity repository 50. Permuted versions of these identities are stored in the directory server 80. The permutation process is discussed in greater detail below.

Figure 2:
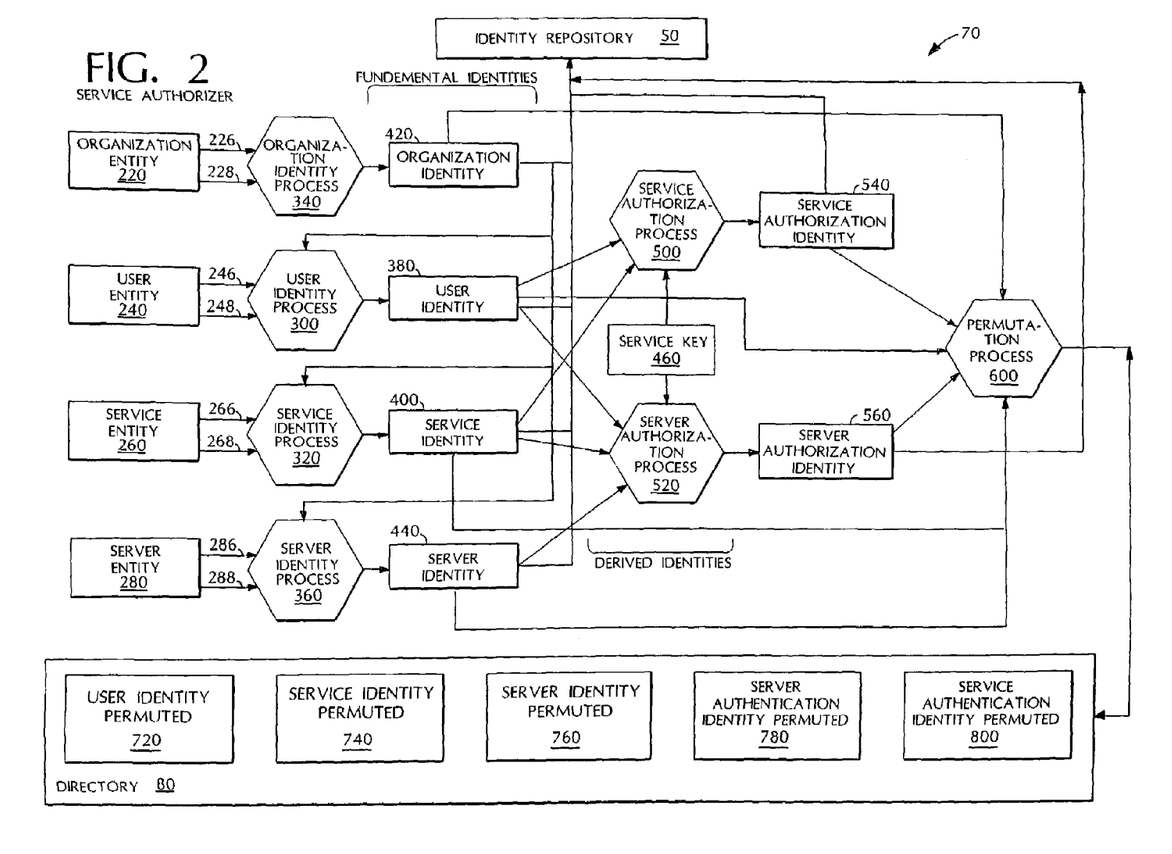
FIG. 2 illustrates generation of identities used in the authorization process.

FIG. 2 illustrates an example of the identity generation process which may be implemented by the service authorizer 70. Fundamental identities may represent, respectively, an organization 220, a user 240, a service 260, and an information delivery device, such as a server 280. In one implementation, each fundamental entity has associated with it credentialing information, which includes a credential and a credential identifier. A credential refers to invariant information ascribed to the entity being identified. For example, an individual's social security number may be used as the credential for a particular user identity. A credential identifier refers to an identifier assigned to a particular type or class of information (e.g., social security number) being used as a credential. For example, a credential identifier may be a unique and randomly assigned 160-bit number identifying the use of a social security number as a user credential.

In some implementations, the credential identifier for an organization may not be generated randomly, such as when an organization or agency is charged with the responsibility of maintaining and assigning unique tokens for organizational credential identities. For example, an organizational credential may be an EIN tax number. Selection of a unique credential identifier for EIN numbers as a credential source would ensure that all identities, created by organizations cooperating with the identity sponsor, are unique.

As shown in FIG. 2, a fundamental organization identity process 340 generates the organization identity 420 based on the organization credential 226 and credential identifier 228. The fundamental organization identity process 340 may be initiated by passing the organization credential 226 through a message digest algorithm to compute a numeric hash value. The fundamental organization identity process 340 creates a linear vector that may consist of the credential identifier 228 and the computed hash of the organization's credential 226. The linear vector then is passed through a message digest algorithm to compute a second hash value. This second hashed value serves as the organization identity 420 and is stored in the identity repository 50. In some implementations, a SHA-1 hashing algorithm may be used as the message digest algorithm. A benefit of using the SHA-1 hashing algorithm is that any linear vector less than $2^{64}$ bits passed through the SHA-1 algorithm produces a unique 160-bit hash value. Other implementations may use alternate message digesting algorithms which produce hash values of different lengths.

Once the organization identity 420 is generated, other fundamental identity generation processes 300, 320, 360 may be initiated to generate a user identity 380, a service identity 400 and a server or device identity 440. As explained earlier, each entity 240, 260, 280 has associated with it credential information which is comprised of a credential and a credential identifier. Each fundamental identity generation process 300, 320, 360 is initiated by passing the appropriate credential through a message digest algorithm to compute a hash value. The fundamental identity process then creates a linear vector of the credential identifier and the computed hash value of the identity's credential. The linear vector is passed through a message digest algorithm to compute a second hashed value. A second linear vector is formed from the organization identity 420 and the second hashed value. This second linear vector is passed through a message digest algorithm, resulting in the user identity 380, service identity 400, or server identity 440. Various cryptographic algorithms may be used for the message digest algorithms. Combinations of various cryptographic algorithms may also be used for the message digest algorithms.

For example, to generate a fundamental user identity 380, the user identity process 300 creates a linear vector of the credential identifier 248 and the computed hash of a user credential 246. The linear vector then is passed through a message digest algorithm to compute a hash value. The user identity process 300 then creates a second linear vector consisting of the organization identity 420 and the hash computed from the user credentialing information 246, 248. This second linear vector is passed through a message digest algorithm resulting in a user identity 380 that is stored in the identity repository 50.

To generate a fundamental service identity 400, the service identity process 320 computes the hash value of a service credential 266. A linear vector of the service credential identifier 268 and the computed hash of the service credential is formed. The linear vector then is passed through a message digest algorithm to compute a hash value. A second linear vector is then formed from the organization identity 420 and the computed hash value of the credentialing information 268, 266. This second linear vector is passed through a message digest algorithm resulting in a service identity 400 that is stored in the identity repository 50.

To generate a fundamental server identity 440, the server identity process 360 computes a hash of the device (e.g., server) credential 286. A linear vector is then formed of the device (e.g., server) credential identifier 288 and the computed hash of the device (e.g., server) credential. The linear vector then is passed through a message digest algorithm to compute a hashed value. The server identity process 360 then creates a second linear vector of the organization identity 420 and the hashed value of the device (e.g., server) server credentialing information 286, 288. This second linear vector is passed through a message digest algorithm resulting in a server identity 440 that is stored in the identity repository 50.

Derived identities are formed from fundamental identities using a keyed hashing process. In one implementation, there are two types of derived identities: a service authorization identity 540 and a server authorization identity 560. As explained earlier, a service authorization identity 540 conveys an identity to delivery of a service to a user, such as access to electronic mail, regardless of which server or device may be delivering the service. A server authorization identity conveys an identity to delivery of a service to a user, such as systems administration privileges, only on a particular server or service delivery element.

Each service that may be delivered by the system and that is represented by a service identity 400 is granted a unique service authentication key 460 by the authentication server 90 (see FIG. 1). In one implementation, the service authentication key 460 is a 192-bit number such as the binary key block from a des3-hmac-sha1 key assigned to a Kerberos principal used to authenticate the service identity. Alternatively, a public key cryptography and public key infrastructure (PKC/PKI) implementation for a unique service authentication key 460 may be used. Other types of authentication systems that are capable of conveying a secure key to a host or device that will deliver a service also may be used.

A service authorization process 500 generates the service authorization identity 540. The service authorization identity 540 is generated by forming a linear vector of the fundamental user identity 380 for the user requesting a particular service and the fundamental service identity 400 for the particular service. This linear vector is then passed through a keyed hashing algorithm using the service authentication key 460 to generate a keyed hash value that serves as the service authorization identity 540 which is stored in the identity repository 50.

A benefit of using the service authentication key 460 generated by the authentication server 90 in the service authorization process 500 is that it couples the identification and authentication frameworks to provide identity based authorization. An additional benefit of using a key hashed algorithm in this process relates to time authorization. In particular, some authentication servers, including Kerberos-based processes, use a service authentication key that expires at a particular time. By generating a service authorization identity 540 using a time-based service authentication key 460, the system may provide authorization for services which expires at a pre-determined time. In one particular implementation, the keyed hash algorithm may be hashed message authentication coding (HMAC) using the SHA-1 hash algorithm (HMAC-SHA1), although other message digesting algorithms may be used as well.

A server authorization process 520 generates the server authorization identity 560. The server authorization identity 560 may be generated in a manner similar to that used by the service authorization process 500. For example, the server authorization identity 560 may be generated by forming a linear vector composed of the fundamental user identity 380 for the user requesting a particular service, the fundamental service identity 400 for the particular service passed, and the fundamental server identity 440 for the device (e.g., server) that will deliver the service. In one implementation, each fundamental identity 380, 400, 440 is 160-bit token resulting in a linear vector of 480 bits. This linear vector is then passed through a keyed hashing algorithm using the service authentication key 460, which also may be time-based, to generate a keyed hash value that serves as the server authorization identity 560. The server authorization identity 560 is stored in the identity repository 50. A benefit of using the service authentication key 460 generated by the authentication server 90 in the server authorization process 520 is that it couples the identification and authentication frameworks to provide identity based authorization at the level of a specific device or server. In addition, the server authorization identity may only be valid for a limited period of time, depending upon whether the service authentication key 460 is time-based. The keyed hash algorithm may be HMAC using SHA-1, although other iterated cryptographic hash algorithms may be used for message digesting as well. A benefit of using HMAC is that the service authentication key may be of any length.

Figure 5:
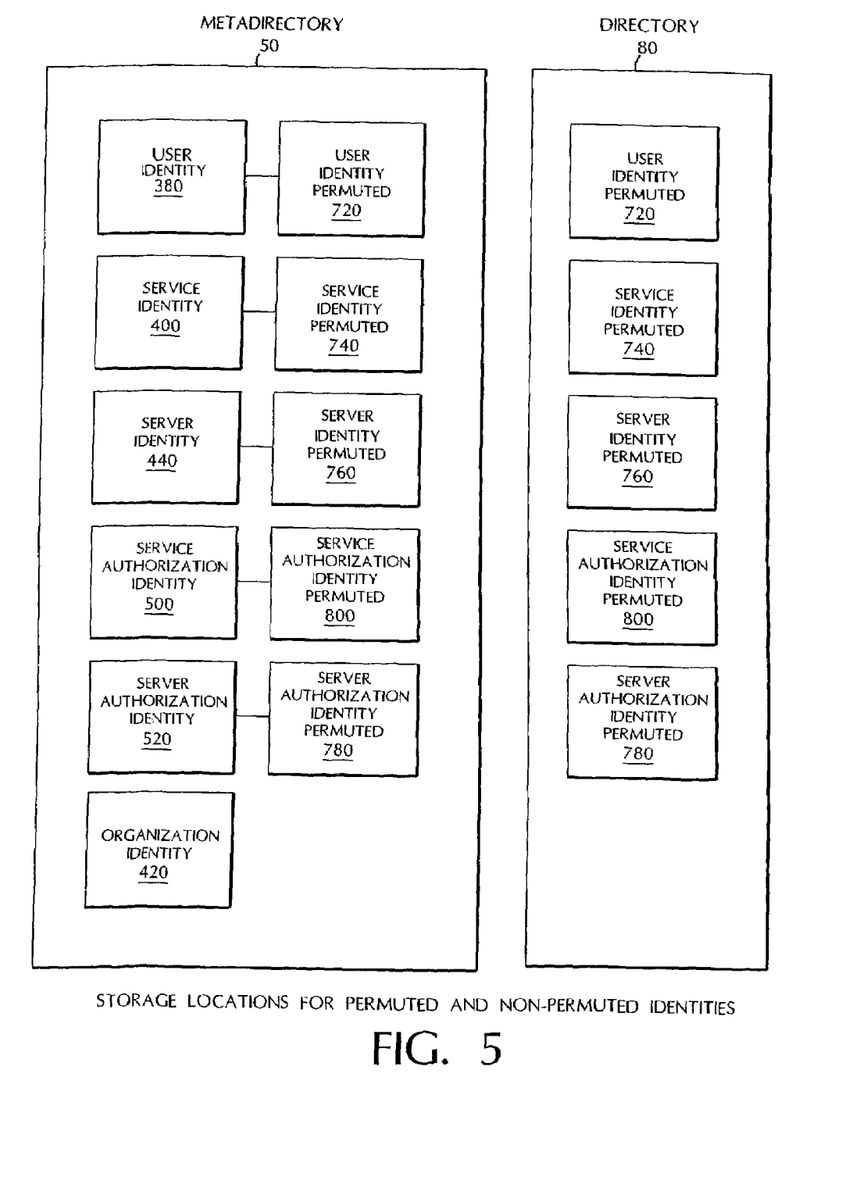
FIG. 5 illustrates storage locations for permuted and non-permuted identities.

Once the fundamental identities 380, 400, 420, 440 and derived identities 540, 560 are generated an identity permutation process 600 is performed. One purpose of the permutation identity process 600 is to shroud the true values of fundamental and derived entities from public view by storing these permuted representations in the directory 80. As shown in FIG. 5, all permuted and non-permuted identities are stored in the identity repository 50, whereas only the permuted identities are stored in directory 80.

Figure 3:
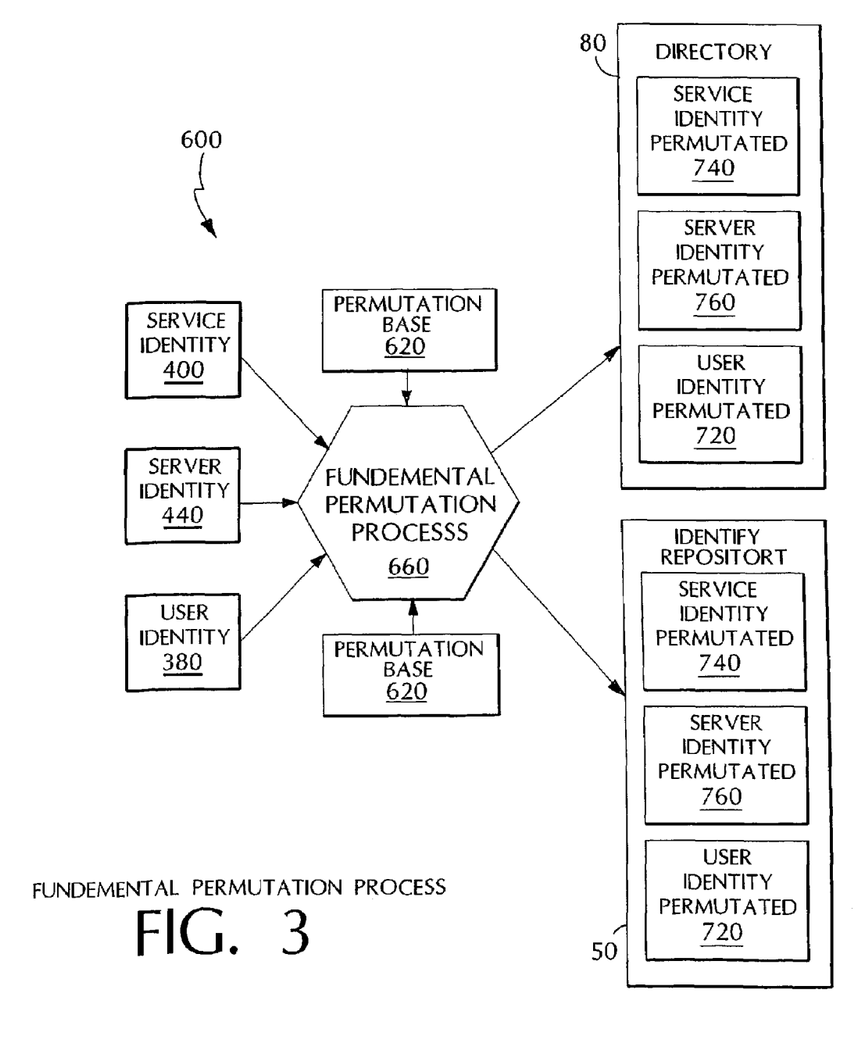
FIG. 3 illustrates a permutation process for fundamental identities.

FIG. 3 illustrates an example of the permutation process 660 to derive permuted identities from fundamental user, service and server identities. A permutation key 640 and permutation base 620 collectively define an identity generation process for a particular organization. In one implementation, the permutation base 620 and permutation key 640 are 160-bit random numbers specific to a single generation of identities for an organization.

Modifying these values may allow the organization to change the published permuted identities 720, 740, 760, 780, 800 stored in directory 80, thereby reducing the utility of unauthorized access to published identities. For example, if the integrity or security of the information stored in the directory 80 is jeopardized, new values may be calculated using the fundamental identities stored in the identity repository 50 and a new permutation base and permutation key. The fundamental identities need not be recalculated, and the various credentials 226, 228, 246, 248, 266, 268, 286, 288 need not be changed.

In a similar fashion the service authentication key 460 serves to denote an authorization generation for an organization. Changing the authorization key 460 changes the values of the permuted service authorization 800 and permuted server authorization identities 780. For example, if the authentication server 90 in a kerberos-based implementation is compromised, a change in the service authentication key 460 assigned to the principal authenticating the service renders knowledge of the old service authentication key useless for creating unauthorized service authorization identity objects 780, 800 in directory 80.

The permutation process 660 permutes the values of fundamental identities 380, 400, 440. In some implementations, the process includes creating a linear identity vector composed of the permutation base 620 and one of the fundamental identities 380, 400, 440. This linear identity vector then is passed through a keyed hashing algorithm using the corresponding permutation key 640. The resulting value, representing a permuted fundamental identity 720, 740, 760 may be stored in the identity repository 50 as well as the directory 80.

Figure 4:
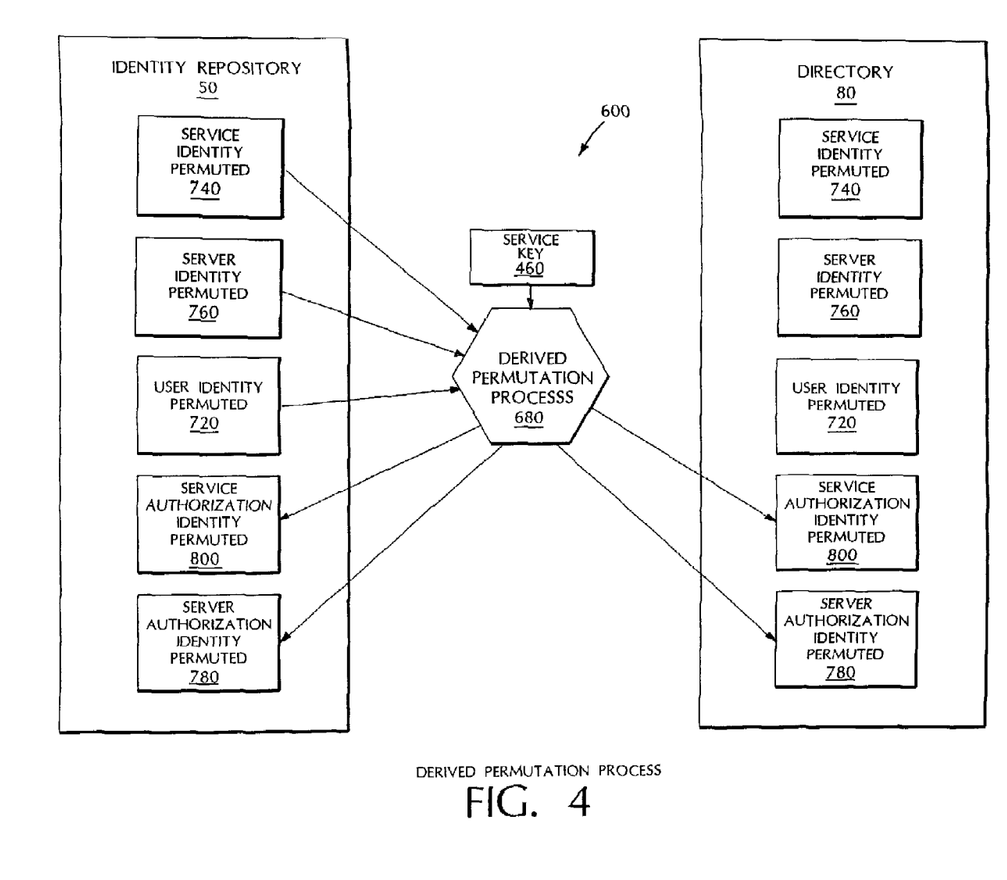
FIG. 4 illustrates a permutation process for derived entities.

As shown in FIG. 4, a permutation process 680 for obtaining permuted values for derived authorization identities 780, 800 uses variants of the service authorization process 500 and server authorization process 520. The variant processes use permuted values of the appropriate fundamental identities 720, 740, 760 rather than the actual identities 380, 400, 440. In particular, to create a permuted service authorization 800, the derived permutation process 680 forms a linear identity vector composed of the permuted user identity 720 and the permuted service identity 740. This linear identity vector is passed to a keyed hash algorithm. The resulting value, representing a permuted service authorization identity 800 is stored in the identity repository 50 and published in the directory 80. Similarly, to create a permuted server authorization identity 780, the derived permutation process 680 forms a linear identity vector composed of the permuted user identity 720, the permuted service identity 740, and the permuted server identity 760. This linear identity vector is passed to a keyed hash algorithm. The resulting value, representing a permuted server authorization identity 780, is stored in the identity repository 50 and published in the directory 80. This alteration in the permutation process is provided to support the real-time authorization process carried out by external service delivery agent 110,120,130,140.

In one implementation, service authorization identities 540 and server authorization identities 560 have attributes that describe conditions under which the service instance represented by the identity may be accessed or used. When the permuted derived identities 780, 800 are published in the directory 80, these attributes are attached to the object instance so that they may be used by the service delivery agents 110, 120, 130, 140 to define quality of delivery parameters for the service.

Real-time authorization refers to the capability of client applications cooperating with service agents 110, 120, 130, 140 to obtain real-time computationally-based service authorizations. For example, a specific user workstation may require access to a specific fileshare (service) on a specific server. The service agents 110, 120, 130, 140 (FIG. 1) are intended as examples only, and additional or other service agents may be present to provide identification, authentication and authorization services.

Figure 6:
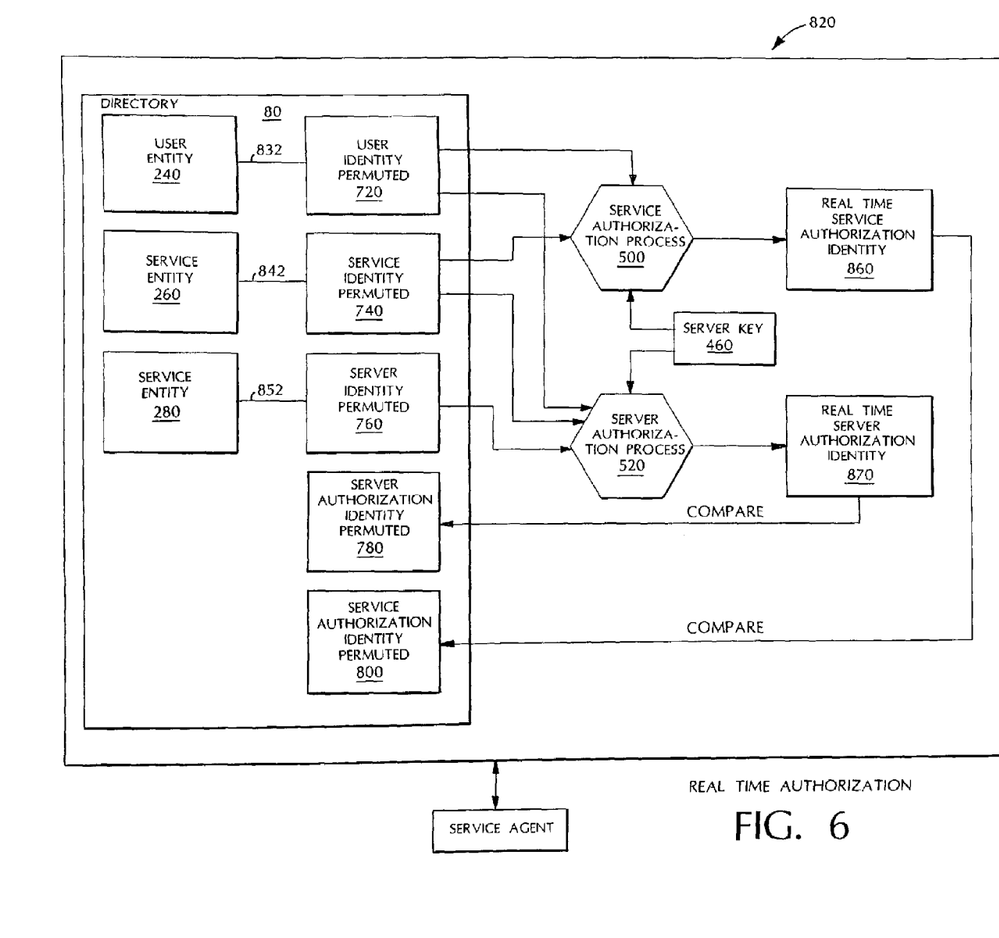
FIG. 6 illustrates a real time authorization process for service agents.

Real-time authorization to access a service is conveyed by the ability of a service agent to compute the correct value of a permuted derived identity object based on a specified user, a specified service and optionally a specified delivery device or host for server level authorizations. Service authorization is a first type of request. Server authorization is a second type of request. As shown in FIG. 6, a real-time authorization process 820 is executed by a service agent in response to a request for service or server access.

To process a request for service access, the real-time authorization process may proceed as follows. First, the service agent or other user device performs a search of the directory 80 for the user entity 240 using an external identifier, such as a user name. As explained earlier, a user entity may be any type of requesting entity known to the system 20. Once the user entity 240 has been located in directory 80, suitable access controls 832 may be employed to obtain from the directory 80 the permuted user identity 720 associated with the user entity 240. Next, the service agent performs a search of the directory 80 for the requested service entity 260 representing the service using an external identifier, for example, electronic mail. Suitable access controls 842 may be employed to obtain from the directory 80 the permuted service identity 740 relating to that particular service. If server level authorization is required, the service agent performs an additional search of the directory 80 for the requested server entity (e.g., device entity) 280 using an external identifier associated with the entity. Suitable access controls 280 may be employed to obtain from the directory 80 the server identity permuted 760 relating to the particular server or device.

Once the permuted fundamental identities 720, 740, 760 have been obtained from the directory 80, the service agent computes a real-time service authorization identity 860 or a real-time server authorization identity 870. In some cases, both may be computed depending upon the request.

The service agent executes the service authorization process 500 to compute the real-time service authorization identity. In one implementation, the service agent obtains the permuted user identity 720 from the directory 80, and the permuted service identity 740 from the directory 80. The service authentication key 460 may be transmitted securely and stored on the device by the management engine 60. Alternatively, the service authentication key 460 may be obtained from the directory 80 where it has been stored in an encrypted fashion using public key cryptography.

The service authorization process 500 forms a linear vector of the permuted user identity 720 and the permuted service identity 740 for the particular service. This linear vector is then passed through a keyed hashing algorithm using the service authentication key 460 to generate a keyed hash value that serves as the real-time service authorization identity 860. By using the permuted fundamental identities 720, 740 and the service authentication key 460 with the same service authorization process 500 used by the service authorizer 70, the real-time authorization process 820 reproduce an equivalent permuted service authorization identity.

Similarly, to compute the real-time server authorization identity, the service agent executes the server authorization process 520. The server authorization process forms a linear vector of the permuted user identity 720, the permuted service identity 740 for the particular service, and the permuted server identity 760. This linear vector is then passed to a keyed hashing algorithm along with the service authentication key 460 to generate a keyed hash value that serves as the real-time server authorization identity 870. By passing the permuted fundamental identities 720, 740, 760 and the service authentication key 460 to the same server authorization process 520 used by the service authorizer 70 an equivalent permuted server authorization identity is formed.

If a service authorization is requested, the service agent compares the computed real-time service authorization identity 860 to the permuted service authorization identity 800 in the directory 80. If the service agent locates the presence of an object with an identical permuted service authorization identity 800 in directory 80, authorization is granted, otherwise, authorization is denied. Similarly, if a server authorization is requested, the service agent compares the computed real-time server authorization identity 870 to the permuted server authorization identity 780 in the directory 80. If the service agent locates the presence of an identical permuted server authorization identity 780 in directory 80, authorization is granted, otherwise, authorization is denied.

Attributes may be attached to the authorization identity objects 780, 800 stored in the directory 80 to convey quality of delivery (QOD) parameters for the service. Service agents may use these attributes to determine how the service may be provisioned at the time of service request. Examples of QOD parameters may be time of day or network address from which the request for service is made.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method comprising:
   generating a user identity from a message digest algorithm that uses as input a user credential associated with a particular user and a user credential identifier identifying a class to which the user credential belongs;
   generating a service authorization identity from a hashed message authentication coding algorithm that uses as input a service authentication key, a user identity and a service identity;
   permuting each of the service authorization identity, the user identity and the service identity; and
   storing the permuted user identity, the permuted service identity and the permuted service authorization identity in a directory;
   wherein generating the user identity comprises a) generating a first hash value from a message digest algorithm using as input the user credential identifier, b) forming a first linear vector of the user credential identifier and the first hash value, c) generating a second hash value from a message digest algorithm using as input the first linear vector, d) forming a second linear vector of the second hash value and an organization identity, and e) generating the user identity from a message digest algorithm using as input the second linear vector.

2. The method of claim 1 including generating the organization identity from a message digest algorithm that uses as input a organization credential associated with a particular organization and a organization credential identifier identifying a class to which the organization credential belongs, wherein generating the organization identity includes:

generating a first hash value from a message digest algorithm using as input the organization credential;

forming a linear vector of the first hash value and the organization credential identifier; and generating the organization identity from the message digest algorithm using as input the linear vector.

3. The method of claim 1 including:

generating the service identity from a message digest algorithm that uses as input a service credential associated with a particular service and a service credential identifier identifying a class to which the service credential belongs.

4. The method of claim 3 wherein generating the service identity comprises:

generating a first hash value from a message digest algorithm using as input the first credential;

forming a first linear vector of the service credential identifier and the first hash value;

generating a second hash value from a message digest algorithm using as input the first linear vector;

forming a second linear vector of the second hash value and an organization identity; and generating the service identity from a message digest algorithm using as input the second linear vector.

5. The method of claim 4 including generating the organization identity from a message digest algorithm that uses as input a organization credential associated with a particular organization and an organization credential identifier identifying a class to which the credential belongs, wherein generating the organization identity includes:

generating a first hash value from a message digest algorithm using as input the organization credential;

forming a linear vector of the first hash value and the organization credential identifier; and generating the organization identity from the message digest algorithm using as input the linear vector.

6. The method of claim 1 comprising:

forming a linear vector of the user identity and service identity; and passing as input the linear vector and the service authentication key to the hashed message authentication coding algorithm to generate the service authorization identity.

7. The method of claim 1 wherein permuting the user identity comprises:

forming a linear vector of a permutation base and the user identity; and generating the permuted user identity from a hashed message authentication coding algorithm using as input the linear vector and a permutation key.

8. The method of claim 1 wherein permuting the service identity comprises:

forming a linear vector of a permutation base and the service identity; and generating the permuted service identity from a hashed message authentication coding algorithm using as input the linear vector and a permutation key.

9. The method of claim 1 wherein permuting the service authorization identity comprises:

forming a linear vector of the permuted user identity and the permuted service identity; and generating the permuted service authorization identity from a hashed message authentication coding algorithm that uses as input the linear vector and the service authentication key.

10. The method of claim 1 comprising receiving the service authentication key from a kerberos-based authentication server.

11. The method of claim 1 comprising storing the permuted user identity, permuted service identity, permuted service authorization identity in a light weight directory access protocol compliant server.

12. The method of claim 1 comprising:

generating a server authorization identity from a hashed message authentication coding algorithm that uses as input the service authentication key, the user identity, the service identity and a server identity;

permuting the server identity and the server authorization identity; and storing the permuted server identity and the permuted server authorization identity in the directory.

13. The method of claim 12 comprising:

generating the server identity from a message digest algorithm that uses as input a server credential associated with a particular server and a server credential identifier identifying a class to which the server credential belongs.

14. The method of claim 13 wherein generating a server identity comprises:

generating a first hash value from a message digest algorithm using as input the server credential;

forming a first linear vector of the server credential identifier and the first hash value;

generating a second hash value from a message digest algorithm using as input the first linear vector;

forming a second linear vector of the second hash value and an organization identity; and generating the server identity from a message digest algorithm using as input the second linear vector.

15. The method of claim 14 including generating the organization identity from a message digest algorithm that uses as input an organization credential associated with a particular organization and an organization credential identifier identifying a class to which the first credential belongs, wherein generating the organization identity includes:

generating a first hash value from a message digest algorithm using as input the organization credential;

forming a linear vector of the first hash value and the organization credential identifier; and generating the organization identity from the message digest algorithm using as input the linear vector.

16. The method of claim 12 including:

forming a linear vector of the user identity, the service identity and the server identity; and passing as input the linear vector and the service authentication key to the hashed message authentication coding algorithm to generate the server authorization identity.

17. The method of claim 12 wherein permuting the server identity comprises:
obtaining a permutation base;
forming a linear vector of the permutation base and server identity; and
generating the permuted server identity from a hashed message authentication coding algorithm using as input the linear vector and a permutation key.

18. The method of claim 12 wherein permuting the server authorization identity comprises:
forming a linear vector of the permuted user identity, the permuted service identity and the permuted server identity; and
generating the permuted server authorization identity from a hashed message authentication coding algorithm that uses as input the linear vector and a service authentication key.

19. An article comprising a machine-readable medium storing machine-readable instructions that, when applied to the machine, cause the machine to:
generate a user identity from a message digest algorithm that uses as input a first user credential associated with a particular user and a second user credential identifying a class to which the first user credential belongs;
generate a service authorization identity from a hashed message authentication coding algorithm that uses as input a service authentication key, the user identity and a service identity;
permute the service authorization identity, the user identity and the service identity; and
store the permuted user identity, permuted service identity, and the permuted service authorization identity in a directory;
wherein generating the user identity comprises a) generating a first hash value from a message digest algorithm using as input the first user credential, b) forming a first linear vector of the first user credential identifier and the first hash value, c) generating a second hash value from a message digest algorithm using as input the first linear vector, d) forming a second linear vector of the second hash value and an organization identity, and d) generating the user identity from a message digest algorithm using as input the second linear vector.

20. The article of claim 19 including instructions that, when applied to the machine, cause the machine to:
generate a first hash value from a message digest algorithm using as input a organization credential associated with a particular organization;
form a linear vector of the first hash value and a organization credential identifier that identifies a class to which the organization credential belongs;
generate the organization identity from the message digest algorithm using as input the linear vector.

21. The article of claim 19 including instructions that, when applied to the machine, cause the machine to:
generate the service identity from a message digest algorithm that uses as input a service credential associated with a particular service and a service credential identifier identifying a class to which the service credential belongs.

22. The article of claim 21 including instructions that, when applied to the machine, cause the machine to:
generate a first hash value from a message digest algorithm using as input the service credential;
form a first linear vector of the service credential identifier and the first hash value;
generate a second hash value from a message digest algorithm using as input the first linear vector;
form a second linear vector of the second hash value and an organization identity; and
generate the service identity from a message digest algorithm using as input the second linear vector.

23. The article of claim 22 including instructions that, when applied to the machine, cause the machine to:
generate a first hash value from a message digest algorithm using as input a organization credential associated with a particular organization;
form a linear vector of the first hash value and a organization credential identifier that identifies a class to which the organization credential belongs; and
generate the organization identity from the message digest algorithm using as input the linear vector.

24. The article of claim 19 including instructions that, when applied to the machine, cause the machine to:
form a linear vector of the user identity and service identity; and
pass as input the linear vector and the service authentication key to the hashed message authentication coding algorithm to generate the service authorization identity.

25. The article of claim 19 including instructions that, when applied to the machine, cause the machine to:
form a linear vector of a permutation base and the user identity; and
generate the permuted user identity from a hashed message authentication coding algorithm using as input the linear vector and a permutation key.

26. The article of claim 19 including instructions that, when applied to the machine, cause the machine to:
form a linear vector of a permutation base and service identity; and
generate the permuted service identity from a hashed message authentication coding algorithm using as input the linear vector and a permutation key.

27. The article of claim 19 including instructions that, when applied to the machine, cause the machine to:
form a linear vector of the permuted user identity and the permuted service identity; and
generate the permuted service authorization identity from a hashed message authentication coding algorithm that uses as input the linear vector and the service authentication key.

28. The article of claim 19 including instructions that, when applied to the machine, cause the machine to receive the service authentication key from a kerberos-based authentication server.

29. The article of claim 19 including instructions that, when applied to the machine, cause the machine to store the permuted user identity, permuted service identity and permuted service authorization identity in a light weight directory access protocol compliant server.

30. The article of claim 19 including instructions that, when applied to the machine, cause the machine to:
generate a server authorization identity from a hashed message authentication coding algorithm that uses as input the service authentication key, the user identity, the service identity and a server identity; and
permute the server identity and the server authorization identity; and
store the permuted server identity and the permuted server authorization identity in the directory.

31. The article of claim 30 including instructions that, when applied to the machine, cause the machine to:

generate the server identity from a message digest algorithm that uses as input a server credential associated with a particular server and a server credential identifier identifying a class to which the server credential belongs.

32. The article of claim 31 including instructions that, when applied to the machine, cause the machine to:
generate a first hash value from a message digest algorithm using as input the server credential;
form a first linear vector of the server credential identifier and the first hash value;
generate a second hash value form a message digest algorithm using as input the first linear vector;
form a second linear vector of the second hash value and an organization identity; and
generate the server identity from a message digest algorithm using as input the second linear vector.

33. The article of claim 32 including instructions that, when applied to the machine, cause the machine to:
generate a first hash value from a message digest algorithm using as input an organization credential associated with a particular organization;
form a linear vector of the first hash value and an organization credential identifier that identifies a class to which the organization credential belongs; and
generate the organization identity from the message digest algorithm using as input the linear vector.

34. The article of claim 30 including instructions that, when applied to the machine, cause the machine to:
form a linear vector of the user identity, the service identity, and the server identity; and
pass as input the linear vector and the service authentication key to the hashed message authentication coding algorithm to generate the server authorization identity.

35. The article of claim 30 including instructions that, when applied to the machine, cause the machine to:
obtain a permutation base;
form a linear vector of the permutation base and server identity; and
generate the permuted server identity from a hashed message authentication coding algorithm using as input the linear vector and a permutation key.

36. The article of claim 30 including instructions that, when applied to the machine, cause the machine to:
form a linear vector of the permuted user identity, the permuted service identity and the permuted server identity; and
generate the permuted server authorization identity from a hashed message authentication coding algorithm that uses as input the linear vector and a service authentication key.

37. A system comprising:
an identity repository and a directory;
a server coupled to the identity repository and the directory, the server adapted to:
generate a service authorization identity from a hashed message authentication coding algorithm that uses as input a service authentication key, a user identity that corresponds to a specific user, and a service identity that corresponds to a specific service to which the user has access; and
generate a server authorization identity from a hashed message authentication coding algorithm that uses as input a service authentication key, the user identity, the service identity and a server identity;
generate the server identity from a message digest algorithm that uses as input a server credential associated with a particular server and a server credential identifier identifying a class to which the server credential belongs; generate a first hash value from a message digest algorithm using as input the server credential; form a first linear vector of the server credential identifier and the first hash value; generate a second hash value from a message digest algorithm using as input the first linear vector; form a second linear vector of the second hash value and an organization identity; and generate the server identity from a message digest algorithm using as input the second linear vector;
permute the user identity, the service identity, the server identity, the service authorization identity and the server authorization identity;
store the user identity, service identity, server identity, service authorization identity, server authorization identity, permuted user identity, permuted service identity, permuted server identity, permuted service authorization identity and permuted server authorization identity in the identity repository; and
store the permuted user identity, permuted service identity, permuted server identity, permuted service authorization identity and permuted server authorization identity in the directory.

38. The system of claim 37 wherein the server is adapted to:
generate the user identity from a message digest algorithm that uses as input a user credential associated with a particular user and a user credential identifier identifying a class to which the user credential belongs.

39. The system of claim 38 wherein the server is adapted to:
generate a first hash value from a message digest algorithm using as input the user credential;
form a first linear vector of the user credential identifier and the first hash value;
generate a second hash value from a message digest algorithm using as input the first linear vector;
form a second linear vector of the second hash value and an organization identity; and
generate the user identity from a message digest algorithm using as input the second linear vector.

40. The system of claim 39 wherein the server is adapted to:
generate the organization identity from a message digest algorithm that uses as input an organization credential and an organization credential identifier;
generate a first hash value from a message digest algorithm using as input the organization credential associated with a particular organization;
form a linear vector of the first hash value and the organization credential identifier that identifies a class to which the organization credential belongs; and
generate the organization identity from the message digest algorithm using as input the second linear vector.

41. The system of claim 37 wherein the server is adapted to:
generate the service identity from a message digest algorithm that uses as input a service credential associated with a particular service and a service credential identifier identifying a class to which the service credential belongs.

42. The system of claim 41 wherein the server is adapted to:
generate a first hash value from a message digest algorithm using as input the service credential;

form a first linear vector of the service credential identifier and the first hash value;
generate a second hash value from a message digest algorithm using as input the first linear vector;
form a second linear vector of the second hash value and an organization identity; and
generate the service identity from a message digest algorithm using as input the second linear vector.

43. The system of claim 42 wherein the server is adapted to:
generate a first hash value from a message digest algorithm using as input an organization credential associated with a particular organization;
form a linear vector of the first hash value and an organization credential identifier that identifies a class to which the organization credential belongs; and
generate the organization identity from the message digest algorithm using as input the linear vector.

44. The system of claim 37 wherein the server is adapted to:
form a linear vector of the user identity and service identity; and
pass as input the linear vector and the service authentication key to the hashed message authentication coding algorithm to generate the service authorization identity.

45. The system of claim 37 wherein the server is adapted to:
form a linear vector of a permutation base and the user identity; and
generate the permuted user identity from a hashed message authentication coding algorithm using as input the linear vector and a permutation key.

46. The system of claim 37 wherein the server is adapted to:
form a linear vector of a permutation base and the service identity; and
generate the permuted service identity from a hashed message authentication coding algorithm using as input the linear vector and a permutation key.

47. The system of claim 37 wherein the server is adapted to:
form a linear vector of the permuted user identity and the permuted service identity; and
generate the permuted service authorization identity from a hashed message authentication coding algorithm using as input the linear vector and a service authentication key.

48. The system of claim 37 wherein the service authentication key is from a kerberos-based authentication server.

49. The system of claim 37 wherein the server is adapted to:
store the permuted user identity, permuted service identity and permuted service authorization identity in a light weight directory access protocol compliant server.

50. The system of claim 37 wherein the server is adapted to:
generate a server authorization identity from a hashed message authentication coding algorithm that uses as input the service authentication key, the user identity, the service identity and a server identity;
permute the server identity and the server authorization identity; and
store the permuted server identity and the permuted server authorization identity in the directory.

51. The system of claim 37 wherein the server is adapted to:
generate a first hash value from a message digest algorithm using as input an organization credential associated with a particular organization;
form a linear vector of the first hash value and an organization credential identifier that identifies a class to which the organization credential belongs; and
generate the organization identity from the message digest algorithm using as input the linear vector.

52. The system of claim 37 wherein the server is adapted to:
form a linear vector of the user identity, the service identity and the server identity; and
pass as input the linear vector and the service authentication key to the hashed message authentication coding algorithm to generate the server authorization identity.

53. The system of claim 37 wherein the server is adapted to:
obtain a permutation base;
form a linear vector of the permutation base and the server identity;
generate the permuted server identity from a hashed message authentication coding algorithm using as input the linear vector and a permutation key.

54. The system of claim 37 wherein the server is adapted to:
form a linear vector of the permuted user identity, the permuted service identity and the permuted server identity; and
generate the permuted server authorization identity from a hashed message authentication coding algorithm that uses as input the linear vector and a service authentication key.

55. The system of claim 37 wherein the server is adapted to:
store the permuted user identity, the permuted service identity, the permuted server identity, the permuted service authorization identity and the permuted server authorization identity in a light weight directory access protocol complaint server.

* * * * *